UNITED STATES PATENT OFFICE.

JOHN GUSTAF ADOLF RHODIN, OF LONDON, ENGLAND, ASSIGNOR TO GILBERT ROSENBUSCH, OF LONDON, ENGLAND.

WHITE HYDRAULIC CEMENT AND PROCESS OF MAKING THE SAME.

1,017,913. Specification of Letters Patent. Patented Feb. 20, 1912.

No Drawing. Application filed January 6, 1911. Serial No. 601,152.

*To all whom it may concern:*

Be it known that I, JOHN GUSTAF ADOLF RHODIN, a subject of the King of Sweden, residing at London, England, have invented certain new and useful Improvements in White Hydraulic Cement and Processes of Making the Same, of which the following is a specification.

This invention relates to the production of hydraulic cement and has for its object the manufacture of such a cement which is substantially white.

In practicing the invention I first prepare a mixture of the chosen ingredients by pulverizing the same either separately or together and then mixing them to secure a thoroughly homogeneous mass. The pulverization may be accomplishd in any of the well known forms of apparatus commonly employed for such purposes as, for instance, a tube mill. The ingredients which I prefer to use are feldspar, preferably of the orthoclase variety, quicklime, common salt, potash alum, and megnesium sulfate. As some variation may be made in the proportions of these ingredients I describe the following examples which have given good results in actual practice:

Example A: 150 parts of feldspar, 150 parts of quicklime, 6 parts of potash alum, 3 parts of common salt and 3 parts of magnesium sulfate.

Example B: 240 parts of feldspar, 180 parts of quicklime, 8 parts of potash alum, 4 parts of common salt and 4 parts of magnesium sulfate.

A good white hydraulic cement may be made by mixing together in a finely divided state from 150 to 240 parts of feldspar, from 150 to 180 parts quicklime, from 6 to 8 parts alum and from 3 to 4 parts common salt; that is, sodium chlorid. To this may be added from 3 to 4 parts magnesium sulfate. The mixture should be calcined at a temperature at which it will remain in a powdered, unsintered state; a temperature which is between, as a rule, 900 and 1110 degrees centigrade.

After the materials have been reduced to a finely divided state and thoroughly mixed, they are calcined in a suitable furnace. This may be of any well known form. The materials should be subjected for about one hour to a temperature not exceeding 1110 degrees centigrade for Example A, and not exceeding 1000 degrees centigrade for Example B. The average temperature should be about 50 degrees centigrade less than the maximum amount given. On the other hand, the temperatures should not fall below 900 degrees centigrade or the necessary reactions will not be brought about. The maximum temperature is determined from the fact in the case of any particular mixture that it should be such a temperature as will not cause clinkering or render regrinding necessary and will not bring out residual colors from the minute quantities of coloring oxids which occur even with the purest natural minerals. The maximum temperature varies with the amount of lime in the mixture. If the temperature is too high the resulting product will not have the same hydraulic properties as when the proper temperature is maintained and it will clinker or become lumpy and will have to be reground whereas if the proper temperature is maintained the materials will come out of the furnace after calcination in the same finely divided state as they went in. The resulting product is a hydraulic cement of good quality and of pure white color.

Considerable variation may take place in the amount and proportions of the different ingredients employed, but of course as the resulting product is to be white no ingredient should be employed which will give a resulting color. For instance the magnesium sulfate cannot be replaced with ferrous sulfate. The magnesium sulfate may however be entirely omitted, and the potash feldspar may be replaced by soda feldspar.

It will be noted that the principal ingredient, the feldspar is itself substantially free from lime. This insures a perfect control of the lime content. The alum may of course be replaced by an aluminum compound having substantially the same aluminum content.

The actual product of the invention from a chemical point of view seems to be a true cement with an inactive silicate of alumina present, and therefore this product contains more total alumina than any other cement known to me without any detriment to its properties.

The advantages of the invention are that the product is pure white in color; it is produced economically and quickly at low temperatures, and in two operations only, viz: grinding and calcining. It has good storing qualities and its ingredients are cheap and readily procured.

What I claim as new and desire to secure by Letters Patent is:—

1. The process of making a white hydraulic cement which comprises producing in a finely divided state a mixture of a mineral of the feldspar group with a suitable proportion of lime and common salt, and calcining the mixture at a temperature above 900° centigrade but below such a temperature as would cause clinkering and make regrinding necessary or would color the product.

2. The process of making white hydraulic cement which consists first in pulverizing and mixing a natural mineral having a large content of silicate of alumina, common salt and a suitable aluminum compound and secondly in calcining the mixture at a temperature above 900° centigrade but below such a temperature as would cause clinkering and make regrinding necessary or would color the product.

3. The porcess of making white hydraulic cement which consists first in pulverizing and mixing a natural mineral having a large content of silicate of alumina, common salt, a suitable aluminum compound and magnesium sulfate, and secondly in calcining the mixture at a temperature above 900° centigrade but below such a temperature as would cause clinkering and make regrinding necessary or would color the product.

4. The process of making a white hydraulic cement which consists in mixing together in a finely divided state suitable proportions of potash feldspar, quicklime, potash alum, common salt and magnesium sulfate and then calcining the mixture at a temperature below that at which the product would clinker, form lumps or develop color.

5. The process of making a white hydraulic cement which consists in mixing together in a finely divided state suitable proportions of feldspar, quicklime, an aluminum compound and common salt and calcining the mixture at a temperature at which the ingredients will form a cementitious body but will remain in the powdered form.

6. The process of making a white hydraulic cement which consists in mixing together in a finely divided state from 150 to 240 parts of feldspar, from 150 to 180 parts of quicklime, from 6 to 8 parts of alum, and from 3 to 4 parts of common salt, and calcining the mixture at a temperature between 900 and 1100 degrees centigrade and at which it will remain in the original powdered state.

7. The process of making a white hydraulic cement which consists in mixing together in a finely divided state from 150 to 240 parts of feldspar, from 150 to 180 parts of quicklime, from 6 to 8 parts of alum, from 3 to 4 parts of common salt and from 3 to 4 parts of magnesium sulfate, and calcining the mixture at a temperature between 900 and 1100 degrees centigrade and at which it will remain in the original powdered state.

8. A white hydraulic cement comprising a calcined unsintered mixture of powdered feldspar, quicklime, alum, salt and magnesium sulfate, said composition retaining its original powdered form but readily setting with water.

9. A white hydraulic cement comprising a calcined unsintered mixture of powdered feldspar, quick lime, an aluminum compound and common salt, said composition retaining its original powdered form but readily setting with water.

10. A white hydraulic cement comprising a calcined unsintered mixture of a powdered natural mineral having a large content of silicate of alumina and free from lime, quicklime, an aluminum compound and common salt.

11. A white hydraulic cement comprising a calcined unsintered mixture of powdered feldspar, quicklime, an aluminum compound, common salt and a small proportion of magnesium sulfate.

12. A white hydraulic cement comprising a calcined unsintered mixture of a powdered natural mineral having a large content of silicate of alumina and free from lime, quicklime, an aluminum compound and common salt, and a small proportion of magnesium sulfate.

In testimony whereof I have affixed my signature in presence of two witnesses.

JOHN GUSTAF ADOLF RHODIN.

Witnesses:
RIPLEY WILSON,
C. P. LIDDON.